United States Patent [19]

Blonder et al.

[11] Patent Number: 5,091,053
[45] Date of Patent: Feb. 25, 1992

[54] MATTE FINISHES ON OPTICAL FIBERS AND OTHER GLASS ARTICLES

[75] Inventors: Greg E. Blonder, Summit; Bertrand H. Johnson, Murray Hill, both of N.J.

[73] Assignee: AT&T Bell Laboratories, Murray Hill, N.J.

[21] Appl. No.: 486,350

[22] Filed: Feb. 28, 1990

[51] Int. Cl.⁵ .................. B44C 1/22; C03C 15/00; C03C 25/06
[52] U.S. Cl. ...................... 156/657; 65/31; 156/663; 252/79.3; 252/79.4
[58] Field of Search .............. 156/654, 659.1, 663, 156/655, 657; 252/79.3, 79.4; 65/31, 3.3, 3.31, 59.25, 59.31; 427/309; 350/96.20, 96.30, 96.29

[56] References Cited

U.S. PATENT DOCUMENTS

| | | | |
|---|---|---|---|
| 3,485,687 | 12/1969 | Chapman et al. | 65/31 X |
| 3,551,228 | 12/1970 | Meth | 252/79.3 X |
| 3,616,098 | 10/1971 | Falls | 65/31 X |
| 4,033,668 | 7/1977 | Presby | 350/96.1 |
| 4,055,458 | 10/1977 | Niederprun | 156/663 |

FOREIGN PATENT DOCUMENTS

| | | |
|---|---|---|
| 35168994 | 5/1985 | Fed. Rep. of Germany . |
| 1534990 | 6/1968 | France . |
| 57-47744 | 3/1982 | Japan . |
| 57-188007 | 11/1982 | Japan . |
| 6059309 | 9/1983 | Japan . |
| 60-174110 | 1/1985 | Japan . |
| 61-127642 | 6/1986 | Japan . |
| 63153510 | 12/1986 | Japan . |
| 512402 | 9/1971 | Switzerland . |
| 1276550 | 10/1969 | United Kingdom . |

*Primary Examiner*—William A. Powell
*Attorney, Agent, or Firm*—Michael J. Urbano

[57] ABSTRACT

A mixture of buffered hydrofluoric acid (e.g., HF and $NH_4F$) and a treating agent (e.g., acetic acid, phosphoric acid, hydrochloric acid, sulfuric acid or formic acid) is used to produce a matte finish on the pure silica cladding of an optical fiber, on a borosilicate glass tube and on a sodium lime glass plate. The matte finish may be used to increase the adhesion of other materials to the glass (e.g., of metal coatings to silica fibers) or to reduce glare.

4 Claims, 1 Drawing Sheet

MATTE FINISHES ON OPTICAL FIBERS AND OTHER GLASS ARTICLES

CROSS REFERENCE TO RELATED APPLICATIONS

This application was concurrently filed with our application Ser. No. 07/486350 entitled "Wet Chemical Etching Technique for Optical Fibers".

BACKGROUND OF THE INVENTION

This invention relates to techniques for forming a matte finish on a glass article such as an optical fiber or a glass plate.

In the manufacture of glass articles, such as plate glass, it is often desirable to reduce glare by forming a textured surface, known as a matte finish, on the article to scatter light and reduce specular reflections. The following patents are representative:

H. Niederprun et al., U.S. Pat. No. 4,055,458, discloses the mat (matte) etching of glass (e.g., plate glass) by means of liquids containing hydrofluoric acid and a soluble fluorine-containing wetting agent, e.g., perfluoroalkane sulfonic acid quaternary ammonium salt, a perfluoroalkane carboxylic acid salt, an alkoxylation product of a perfluoroalkane sulfonamide, or the like.

J. W. Falls, U.S. Pat. No. 3,616,098, describes glare-reducing glass produced by including an undissolved inorganic salt (e.g., potassium bifluoride, sodium bifluoride or calcium phosphate) in a hydrofluoric acid bath saturated with ammonium bifluoride or other salt.

On the other hand, in optical fiber technology, in particular the silica fiber segment of that art related to hermetic packaging of optoelectronic devices, it is well-known to form a metal coating on the exterior silica surface (cladding) of the fiber in order to solder the fiber to the package. The prevalent prior art technique for depositing the metal coating is sputtering. This approach, however, is not without its limitations: (1) The need for a sputtering machine is cumbersome and expensive; (2) Most sputtering machines are designed to deposit metal onto planar (e.g., semiconductor wafer) surfaces. The cylindrical surface of a fiber and pragmatic considerations have led prior art workers to utilize two separate sputtering steps-the first to deposit metal onto essentially half the cylindrical surface and the second to deposit onto the other half. However, where the "halves" meet, undesirable seams are formed which decrease reliability; and (3) The sputtering process requires a vacuum environment to reduce background contamination. This requirement inherently precludes having attached to the fiber anything which would introduce contamination into the vacuum chamber. Thus, one would remove the plastic jacket which coats the fiber and, furthermore, would avoid attaching a silicon block mount or pigtail connector, for example.

Therefore, a metal deposition process which can uniformly coat curved surfaces and which is not so contamination sensitive, such as electroplating, might be more desirable were it not for the fact that the electroplating of metal onto glass fibers suffers from poor adhesion.

SUMMARY OF THE INVENTION

In accordance with one aspect of the invention, a matte finish is produced on at least a portion of a glass article by subjecting that portion to a mixture comprising a fluorine-based etchant and a treating agent comprising an acid which by itself, does not significantly etch the article. Illustratively the treating agent is selected from the group consisting of acetic acid, phosphoric acid, hydrochloric acid, sulfuric acid, and formic acid. Depending on the particular treating agent chosen, matte finishes can be formed on a variety of glass materials (e.g., borosilicate glass, pure silica and sodium lime glass) and on a variety of articles (e.g., glass tubes, silica optical fibers and glass plates).

Applications of the invention range from the packaging of optoelectronic components to the reduction of glare on glass plates and the like. In the former case, an illustrative embodiment of the invention involves forming a matte finish on the portion of a fiber to be soldered or otherwise hermetically sealed through the wall of the package. Before actually sealing the fiber to the package a metal coating is deposited, preferably electroplated, onto the matte finish portion. The matte finish enhances the adhesion of the coating and thus eliminates the need to rely on expensive, cumbersome and less uniform prior art sputtering techniques.

Another embodiment of the invention, therefore, is a silica optical fiber having a matte finish on at least a portion of an exterior silica surface of the fiber. Yet another embodiment is such a fiber with a metal coating on the matte finish portion, and still a third embodiment is an optoelectronic package incorporating such fibers.

BRIEF DESCRIPTION OF THE DRAWING

The invention, together with its various features and advantages, can be readily understood from the following more detailed description taken in conjunction with the accompanying drawing, in which.

DETAILED DESCRIPTION

Figure 1:
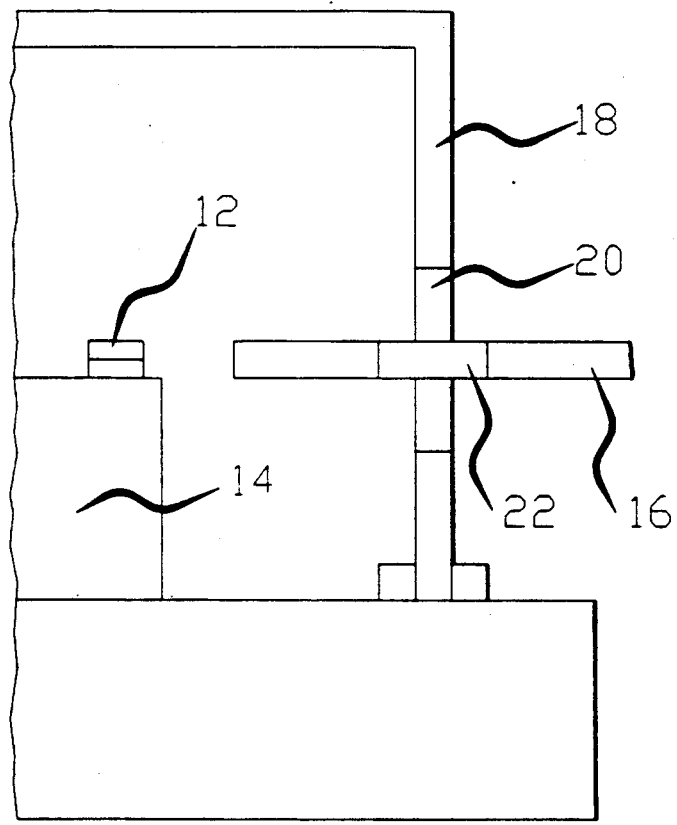
FIG. 1 is a schematic cross-sectional view of an optoelectronic package with an optical fiber hermetically sealed in a sidewall of the package.

Turning now to FIG. 1, there is shown a hermetic package 10 for an optoelectronic component 12 (e.g., a semiconductor laser or photodiode) mounted on a block or carrier 14. In order to allow light to communicate between the interior and exterior of the package an optical fiber 16 is inserted through a hole in the sidewall 18. The fiber 16 is aligned with the component 12 by well-known means not shown, and the end of the fiber adjacent component 12 has a lens thereon to enhance coupling efficiency. Preferably, the lens is formed by an etching process as described in our concurrently filed application. A hermetic seal 20 is formed between the wall and the fiber, illustratively by soldering. In order to ensure that a good quality seal is formed the portion 22 of the fiber which extends through the wall is metalized.

Figure 2:
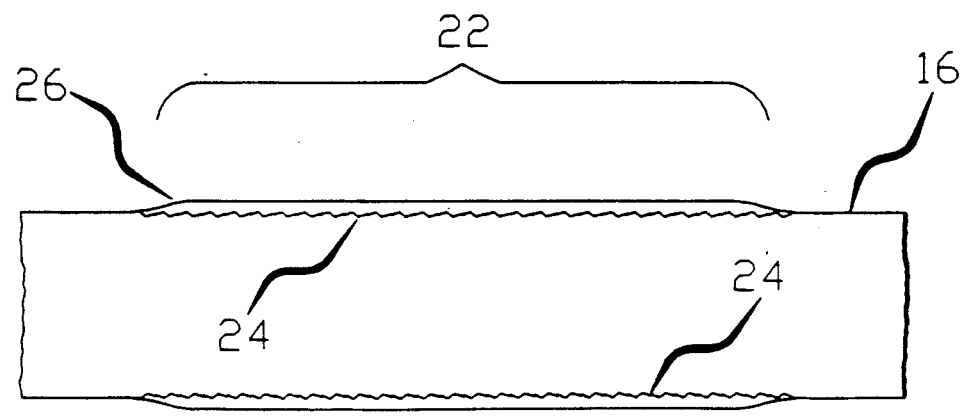
FIG. 2 is a schematic cross-sectional view of a metalized optical fiber in accordance with one embodiment of the invention.

In accordance with one aspect of the invention, as depicted in FIG. 2, the metalization of the fiber is preceded by an etching process which produces a textured or matte finish 24 to enhance adhesion of the metal coating 26. As a consequence, relatively uniform metal coatings may be deposited by straight-forward, well-known electroplating (e.g., of layers of Ni and Au), rather than by sputtering.

In general, the textured or matte finish is formed by subjecting the desired portion of the fiber to a mixture comprising a fluorine-based etchant and a treating agent comprising an acid which by itself does not significantly etch glass. In a preferred embodiment for use with silica fibers, the etchant comprises buffered hydrofluoric acid and the treating agent comprises acetic acid, hydrochloric acid or sulfuric acid.

EXAMPLE I

Single mode and multimode optical fibers having pure silica claddings and 125 $\mu$m outside diameters were subjected to a mixture comprising by volume 25% of 3:1 BOE and 75% of the commercially available, electronic grade treating agent described below. The BOE (buffered oxide etch) solution contained 3 parts of 40% $NH_4F$ to 1 part 49% HF by volume and this is known as 3:1 BOE. In each case below the mixture was at a temperature of about 20° C. and the fiber was exposed to the mixture for about 50 minutes.

When 99% acetic acid as used as the treating agent, the mixture produced a fine grain ($\lesssim 1$ $\mu$m) matte finish on the exterior surface (silica cladding) of the fibers. This mixture was very attractive because it etched the fiber uniformly, not selectively (i.e., the etch rate was not dependent on the doping concentration or dopant species across the fiber end face). Moreover, we have found that matte finishes are produced when the proportion of acetic acid to 3:1 BOE exceeds about 55%.

When 37% hydrochloric acid or 97% sulfuric acid was used as the treating agent, both mixtures produced a fine grain ($\approx 5$ $\mu$m) orange peel finish on the exterior surface (silica cladding) of the fiber. Note, the mixture of BOE and sulfuric acid was exothermic, and the fiber was not brought into contact with the mixture until the latter had cooled to about 20° C. In addition, the hydrochloric acid treating agent generated a precipitate (probably $NH_4F$ salt).

When, however, 70% nitric acid, 88% formic acid or 86% phosphoric acid was used as the treating agent, the fiber remained smooth—no matte or otherwise textured finish was observed.

As noted earlier, the invention is applicable to glass articles other than optical fibers. Examples II and III, below, relate to glass tubes and glass plates, respectively.

EXAMPLE II

Borosilicate glass (e.g., Pyrex) tubes were subjected to a mixture comprising by volume 25% of 3:1 BOE, as defined in Example I, and 75% of a commercially available, electronic grade treating agent. Exposure was at about 20° C. for about 50 minutes.

When 99% acetic acid was used as the treating agent, a fine grain ($\lesssim 1$ $\mu$m) matte finish was produced on the exposed surfaces of the tube.

When 86% phosphoric acid was used as the treating agent, a diffuse, crystal-shaped matte finish with feature sizes of $\approx 5$ $\mu$m was produced on the exposed surfaces of the tubes.

When 88% formic acid was used as the treating agent, the portion of the tubes below the surface of the liquid mixture did not exhibit any observable matte or otherwise textured finish. However, a matte finish was produced on the portion of the tube above the surface of the mixture; this result indicates that the vapor phase of the mixture produced the matte finish.

When, however, 97% sulfuric acid, 70% nitric acid or 37% hydrochloric acid was used as the treating agent, the tubes remained smooth—no matte or otherwise textured finish was observed.

EXAMPLE III

A sodium lime glass plate was subjected to a mixture comprising by volume 25% of 3:1 BOE, as defined in Example I, and 75% of commercially available, electronic grade 99% acetic acid. Exposure was at about 20° C. for about 50 minutes. A fine grain ($\lesssim 1$ $\mu$m) matte finish was produced on the surfaces of the plate.

In summary, it appears that acetic acid is preferred as a treating agent inasmuch as mixtures containing it produced a fine grain matte finish on all three types of glass articles and etching was essentially uniform (i.e., nonselective with respect to different species, e.g., dopants) in different regions of the article.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, other proportions of BOE to treating agent (e.g., a few percent BOE to as much as about 50% BOE) and other proportions of HF and $NH_4F$ to water (e.g., 3:1 to 7:1) are expected to be suitable. In general, however, as with acetic acid, it is expected that a relatively high proportion of the treating agent is required to produce the desired textured or matte finish. Likewise, a relatively broad range of etching times and temperatures can be used effectively.

We claim:

1. A method of forming a textured or matte finish on at least a portion of a silica cladding of an optical fiber by subjecting said cladding portion to a mixture comprising a fluorine-based etchant and a treating agent, said agent comprising an acid which, by itself, does not significantly etch said portion and which is selected from the group consisting of acetic acid, hydrochloric acid and sulfuric acid.

2. The method of claim 1 wherein said mixture comprises by volume about 25% of 3:1 BOE and 75% of said treating agent.

3. The method of claim 1 further including depositing a metal layer on said portion having a textured or matte finish.

4. The method of claim 3 wherein said metal layer is deposited by electroplating.

* * * * *

UNITED STATES PATENT AND TRADEMARK OFFICE
CERTIFICATE OF CORRECTION

PATENT NO. : 5,091,053

DATED : February 25, 1992

INVENTOR(S) : Greg E. Blonder, Bertrand H. Johnson

It is certified that error appears in the above-identified patent and that said Letters Patent is hereby corrected as shown below:

Column 1, lines 8 and 9, "Ser. No. 07/486350 entitled "Wet Chemical Etching Technique for Optical Fibers"." should read --Ser. No. 07/486630 entitled "Optical Fiber With An Integral Lens At Its End Portion", now U.S. Patent 5,101,457.--.

Signed and Sealed this

Twenty-sixth Day of September, 1995

Attest:

BRUCE LEHMAN

Attesting Officer     Commissioner of Patents and Trademarks